United States Patent [19]

Kaneko

[11] Patent Number: 5,349,581
[45] Date of Patent: Sep. 20, 1994

[54] DETECTING LOCATION OF TIME SLOT WHERE DATA BEGINS USING POINTER IN JUSTIFICATION OR STUFFING SYNCHRONOUS TDM

[75] Inventor: Hiroaki Kaneko, Tokyo, Japan

[73] Assignee: NEC Corporation, Japan

[21] Appl. No.: 905,618

[22] Filed: Jun. 29, 1992

[30] Foreign Application Priority Data

Jun. 28, 1991 [JP] Japan .................................. 3-185274

[51] Int. Cl.$^5$ .............................................. H04J 3/07
[52] U.S. Cl. .................................. 370/102; 370/105.2
[58] Field of Search ...................... 370/102, 97, 98, 99, 370/82, 83, 84, 100.1, 105.1, 105.2, 105.3, 105.4, 108; 375/112, 118

[56] References Cited

U.S. PATENT DOCUMENTS

| | | | |
|---|---|---|---|
| 4,811,340 | 3/1989 | McEachern et al. | 370/102 |
| 5,030,951 | 7/1991 | Eda et al. | 370/102 |
| 5,172,376 | 12/1992 | Chopping et al. | 370/102 |

Primary Examiner—Benedict V. Safourek
Assistant Examiner—Dang Ton
Attorney, Agent, or Firm—Ostrolenk, Faber, Gerb & Soffen

[57] ABSTRACT

In a synchronous TDM communications system wherein the data is transmitted after being subject to zero, negative or positive justification, a location of a time slot where data having a predetermined length begins, is specified by detecting a pointer. The pointer, which is included in a demultiplexed channel information, is extracted from the demultiplexed channel information. Further, a pointer value indicative of the predetermined length is detected. Still further, a justification status is also detected using the pointer extracted. On the other hand, a timing signal is received which corresponds to the zero justification. A pointer offset is produced using the timing signal, while another pointer offsets are generated by advancing and retarding the pointer offset by one time slot. Subsequently, one of the three offsets is selected depending on the justification status. A comparator compares the pointer offset selected and the pointer value and outputs a signal indicative of the first time slot of the data in the event that the comparison coincidence has been detected.

2 Claims, 4 Drawing Sheets

DETECTING LOCATION OF TIME SLOT WHERE DATA BEGINS USING POINTER IN JUSTIFICATION OR STUFFING SYNCHRONOUS TDM

BACKGROUND OF THE INVENTION

1. Field of the Invention

The present invention relates generally to improvements in a pulse justification (stuffing) synchronous TDM (time division multiplexing), and more specifically to a method and arrangement of specifying a leading time slot of a data stream by detecting a pointer involved in each demultiplexed channel information in a TDM digital transmission system.

2. Description of the Prior Art

It is known in the art to determine the location of the byte (viz., time slot) where data begins by means of detecting a pointer involved in demultiplexed channel information. The pointer further carries the pointer value and frequency stuffing information of positive, negative or zero justification. The pointer value indicates the offset between the pointer and the first byte of the data.

Before turning to the present invention it is deemed advantageous to discuss, with reference to FIGS. 1 and 2, a known pointer processing arrangement which determines the location of a time slot of the data whose information length is previously determined and used as a virtual container, for example.

The arrangement shown in FIG. 1 is illustrated as including only three demultiplexed data channels 10a–10c for the sake of simplifying the drawing and the descriptions thereof. Three pointer detectors 12a–12c are provided in the data channels 10a–10c and are respectively arranged to receive three channel data Da–Dc. The arrangement of FIG. 1 further includes three essentially identical justification discriminators 14a–14c, three essentially identical selectors 16a–16c, three essentially identical pointer offset counters 18a–18c and three essentially identical comparators 20a–20c, all of which are respectively provided for the three channels 10a–10c.

A pointer offset generator 22 is provided to receive three timing signals 22a–22c and a clock CLK. The timing signals 22a, 22b and 22c are respectively a zero, negative and positive justification timing signals. The generator 22 produces three kinds of clocks, viz., a zero justification clock 24a, a negative justification clock 24b and a positive justification clock 24c.

For the sake of simplifying the description, only the operations of one of the channels, viz., channel 10a, will be described with reference to the blocks 12a, 14a, 16a, 18a, 20a and 22 associated with said channel 10a. The same discussions hold for the remaining channels 10b and 10c.

The pointer detector 12a is supplied with the channel data Da and extracts a pointer (10 bits merely by way of example) included therein. The pointer thus derived is applied to the justification discriminator 14a which compares a preceding pointer memorized therein with the newly applied pointer, and then produces a justification signal 26a and the previously memorized pointer value denoted by 28a. The pointer offset generator 22 supplies the selector 16a with the three clocks 24a–24c. The selector 16a selects one of the clocks 24a–24b depending on the justification signal 26a, and applies the selected clock 17a to the pointer offset counter 18a which issues the pointer offset 19a by counting the applied clock. Lastly, the comparator 20a receives the pointer offset from the counter 18a and the pointer value from the justification discriminator 14a and compares the same. The comparator 20a generates an output 30a which indicates the location of the byte(s) where the data (e.g., a virtual container) begins.

Similarly, the comparators 20b, 20c respectively generate outputs 30b, 30c similar to the output 30a in the same manner as mentioned above. The justification discriminator 14b, 14c also produce the signals 26b, 28b, 26c and 28c which respectively correspond to the counterparts 26a, 28a as mentioned above.

The operations of the FIG. 1 arrangement will further be described with reference to a timing chart schematically shown in FIG. 2. As in the above, only the operations of the channel 10a will be given in that those of the other channels 10b, 10c are exactly equal thereto. The data and signals whose timing charts are depicted in FIG. 2, appear in the FIG. 1 arrangement and thus are denoted by the reference numerals and/or characters utilized in FIG. 1.

As illustrated in FIG. 2, the data Da transmitted over the channel 10a includes two pointers P and three time slots 50, 52 and 54 which denote respectively the time slots for zero, negative and positive justifications. No data is located or available at the time slots 50, 52 and 54. Therefore, the timing signal 22a (zero justification) assumes a low level at the time slots 50, 52, while the signal 22b (negative justification) a low level only at the time slot 50. On the other hand, the timing signal 22c (positive justification) takes a low level at the time slots 50, 52 and 54. While the timing signals 22a–22c assume the low levels, the clock CLK is blocked by the pointer offset generator 22. It is therefore understood that the clocks 24a–24c exhibit the illustrated waveforms.

In the following it is assumed that: (a) the justification status signal 26a indicates the zero justification (indicated by "0") during time points T1–T2 and the positive justification (indicated by "+") after T2 and, (b) the pointer value signal 28a indicates L both during T1–T2 and after T2.

In this case, the selector 16a selects the clock signal 24a (zero justification) during the time points T1–T2 and the clock signal 24c (positive justification) after the time point T2. The pointer offset counter 18a is supplied with the clock signals selected by the selector 16a and counts the clocks. It is further assumed that the output 19a of the counter 18a indicates the counted values (viz., ..., L−1, L, L+1, ...) as shown in FIG. 2. Thus, the comparator 20a detects the coincidence of the signals 19a, 28a at time slots TS1, TS2 and outputs pulses H during TS1, TS2 each of which indicates the location of the byte where the data (e.g., virtual container) begins.

The above mentioned prior art technique, however, suffers from the drawback in that all the channels should be provided with the pointer offset counters (18a–18c in the above case). In the case where a large number of channels are necessary, a bulky, complicate and expensive arrangement inevitably results.

SUMMARY OF THE INVENTION

It is an object of the present invention to provide improved techniques of detecting the location of time slot where data begins by using a pointer in pulse justification synchronous TDM.

More specifically, a first aspect of the present invention comes in a method of determining a location of a time slot where data having a predetermined length begins by detecting a pointer included in a demultiplexed channel information in a synchronous TDM communications system, the data being transmitted after being subject to zero, negative or positive justification, the method comprising the steps of: (a) extracting a pointer from the demultiplexed channel information; (b) detecting a pointer value indicative of the predetermined length and detecting a justification status from the pointer extracted; (c) receiving a timing signal which corresponds to the zero justification; (d) producing first pointer offset using the timing signal; (e) producing second and third pointer offsets by advancing and retarding the first pointer offset by one time slot, respectively; (f) selecting one of the first to third pointer offsets depending on the justification status; and (g) comparing the pointer offset selected and the pointer value and outputting a signal indicative of a leading time slot of the data in the event that the comparison coincidence has been detected.

A second aspect of the present invention comes in the form of an arrangement of determining a location of a time slot where data having a predetermined length begins by detecting a pointer included in a demultiplexed channel information in a synchronous TDM communications system, the data being transmitted after being subject to zero, negative or positive justification, the method comprising the steps of: means for extracting a pointer from the demultiplexed channel information; means for detecting a pointer value indicative of the predetermined length and detecting a justification status from the pointer extracted; means for receiving a timing signal which corresponds to the zero justification; means for producing first pointer offset using the timing signal; means for producing second and third pointer offsets by advancing and retarding the first pointer offset by one time slot, respectively; means for selecting one of the first to third pointer offsets depending on the justification status; and means for comparing the pointer offset selected and the pointer value and outputting a signal indicative of a leading time slot of the data in the event that the comparison coincidence has been detected.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 3:
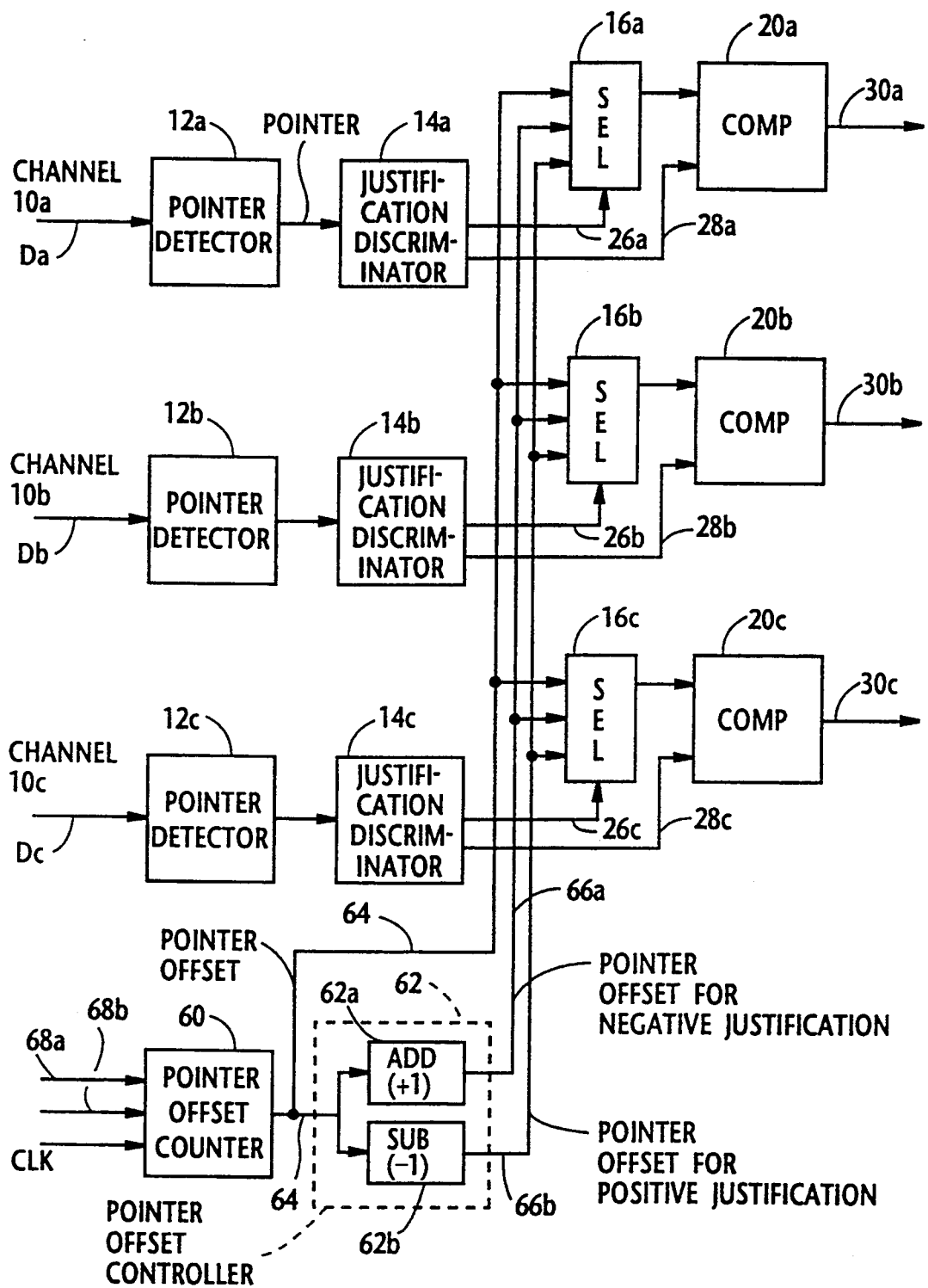
FIG. 3 is a block diagram showing the arrangement which characterizes an embodiment of the present invention.

Reference is now made to FIG. 3, wherein there is shown an arrangement showing in block diagram the preferred embodiment of the present invention.

Figure 1:
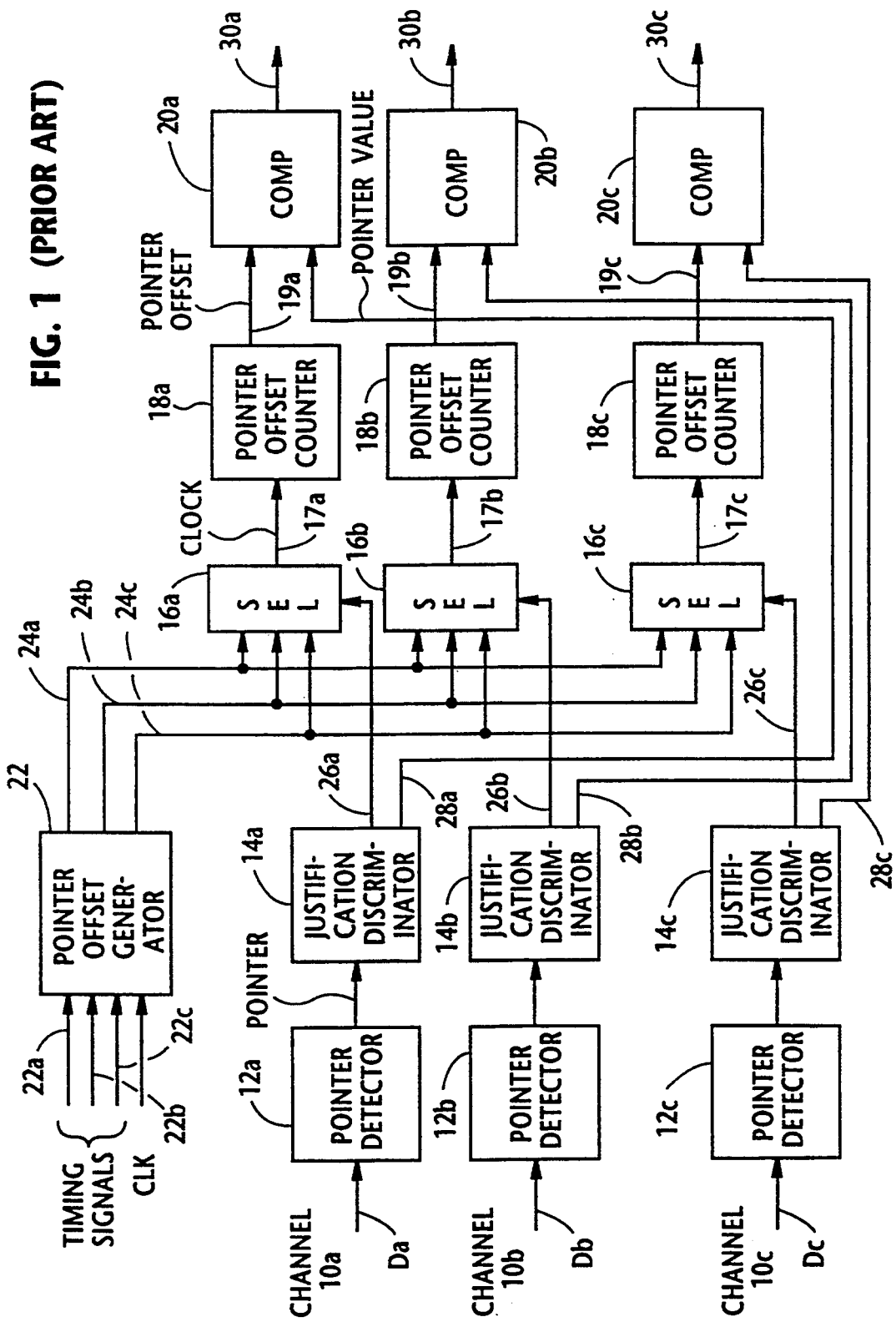
FIG. 1 is a block diagram showing the prior art arrangement discussed in the opening paragraphs of the instant disclosure.

The arrangement of FIG. 3 differs from that of FIG. 1 in that the former arrangement includes a single pointer offset counter 60 and a pointer offset controller 62 in place of the pointer offset counters 18a–18c and the pointer offset generator 22 of FIG. 1. Further, each of the selectors 16a–16c is directly connected to the corresponding comparator.

It is understood that the utility of the present invention increases markedly with the increase in the number of the channels involved.

As shown, the pointer offset controller 62 includes an adder 62a and a subtracter 62b. The adder 62a is such as to advance, by one time slot, a pointer offset 64 which is outputted from the pointer offset counter 60. The pointer offset 64 corresponds to the pointer offset 19a (FIG. 1) when the selector 16a selects the clock 22a (viz., in the case of the zero justification). The output of the adder 62a (denoted by 66a) is a pointer offset for negative justification. On the other hand, subtracter 62b retards the pointer offset 64 by one time slot. The output of the subtracter 62b (depicted by 66b) is a pointer offset for positive justification.

Figure 2:
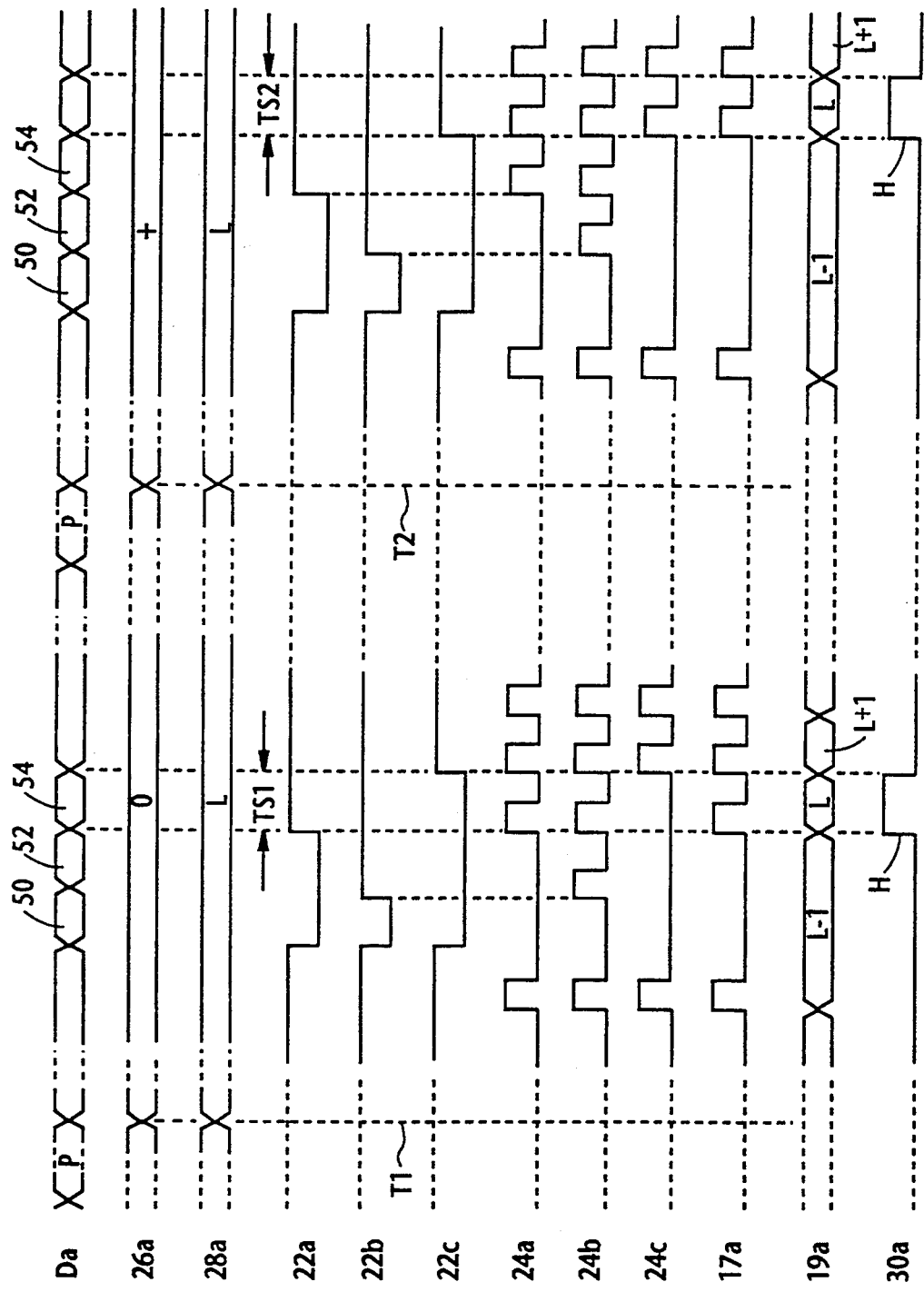
FIG. 2 is a timing chart depicting the operations of the FIG. 1 prior art.

The pointer offset counter 60 is supplied with a clock CLK, a timing signal 68a and a counter initialization signal 68b. The clock CLK in question is identical with the clock CLK applied to the pointer offset generator 22 (FIG. 1). The timing signal 68a is identical with the timing signal 22a (FIGS. 1 and 2). On the other hand, the counter initialization signal 68a is used to initialize the counter 60 when it counts up a predetermined number.

The operations of the embodiment shown in FIG. 2 will be discussed with reference to a timing chart shown in FIG. 4. It will be noted that the operations of this embodiment are essentially similar to the prior art and differ in connection with the operations of the counter 60 and the pointer offset controller 62. Accordingly, only the operations which are unique to this embodiment will be discussed for the sake of brevity.

Similar to the discussion of the above mentioned prior art, the operations of the channel 10a only will be described in that those of the other channels 10b, 10c are the same. The reference numerals and codes used in FIG. 3, are utilized in the timing chart of FIG. 4.

Figure 4:
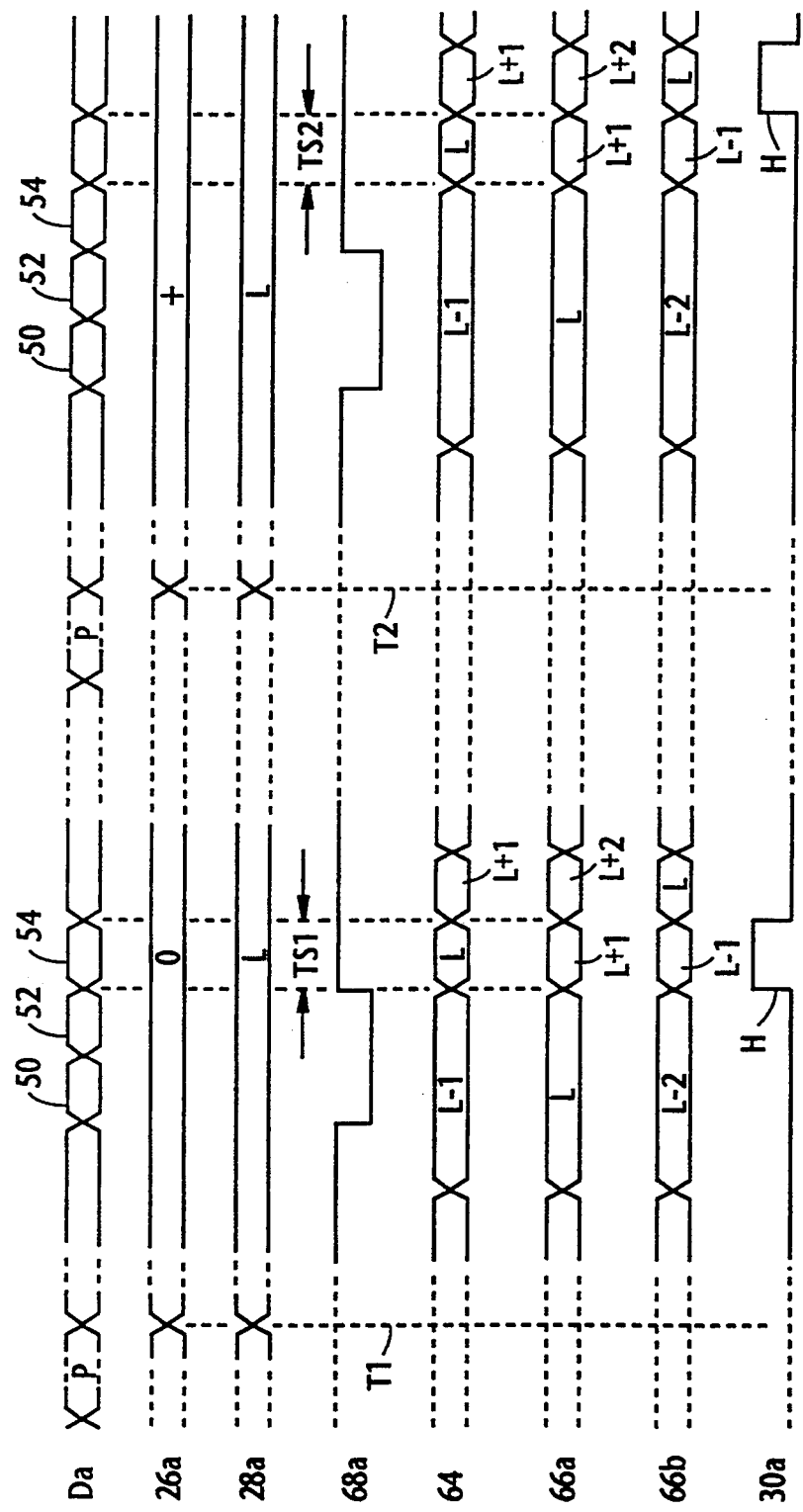
FIG. 4 is a timing chart depicting the operations which characterize the embodiment of the present invention.

As illustrated in FIG. 4, the data Da over the channel 10a includes two pointers P and three time slots 50, 52 and 54 as in the prior art. Thus, the time slots 50, 52 and 54 denote respectively the time slots for zero, negative and positive justifications. As mentioned above, no data is located or available in the time slots 50, 52 and 54. Therefore, the timing signal 68a, which corresponds to the timing signal 22a (zero justification), assumes a low level during the time slots 50 and 52. The pointer offset counter 60 counts the clock CLK except for the low level of the timing signal 68a and outputs the pointer offset 64 which exhibits the illustrated waveforms.

Subsequently, the adder 62a advances the pointer offset 64 by one time slot and outputs the modified pointer offset 66a which in this case is the pointer offset for negative justification. On the other hand, subtracter 62b retards the pointer offset 64 by one time slot. The output 66b of the subtracter 62b is the pointer offset for positive justification.

As in the case of the prior art, the justification status signal 26a indicates a zero justification (indicated by "0") during time points T1–T2 and the positive justification (indicated by "+") after T2. Further, the pointer value signal 28a indicates L both during T1–T2 and after T2.

In such a case, the selector 16a selects the pointer offset 64 during the time points T1–T2 and the pointer offset signal 66b (positive justification) after the time point T2. Thus, the comparator 20a detects the coincidence of the signal 28a and the point offset 64 at time slot TS1 and generates an output 30a including a pulse H, at the time slot TS1. Further, the comparator 20a detects the coincidence of the signal 28a and the point offset 66b at time slot TS2. Thus, the output 30a includes a pulse H at the time slot TS2.

Each of the outputs 30a is used to define the location of the time slot where the data begins at an external arrangement (not shown).

It will be understood that the above disclosure is representative of only two possible embodiments of the present invention and that the concept on which the invention is based is not specifically limited thereto.

What is claimed is:

1. A method of determining a location of a time slot where data having a predetermined length begins by detecting a pointer included in a demultiplexed channel information in a synchronous TDM communications system, the data being transmitted after being subject to zero, negative or positive justification, said method comprising the steps of:
   (a) extracting a pointer from the demultiplexed channel information;
   (b) detecting a pointer value indicative of the predetermined length and detecting a justification status from the pointer extracted;
   (c) receiving a timing signal which corresponds to the zero justification;
   (d) producing first pointer offset using said timing signal;
   (e) producing second and third pointer offsets by advancing and retarding said first pointer offset by one time slot, respectively;
   (f) selecting one of said first to third pointer offsets depending on said justification status; and
   (g) comparing the pointer offset selected and said pointer value and outputting a signal indicative of a leading time slot of the data in the event that the comparison coincidence has been detected.

2. An arrangement of determining a location of a time slot where data having a predetermined length begins by detecting a pointer included in a demultiplexed channel information in a synchronous TDM communications system, the data being transmitted after being subject to zero, negative or positive justification, said arrangement comprising:
   means for extracting a pointer from the demultiplexed channel information;
   means for detecting a pointer value indicative of the predetermined length and detecting a justification status from the pointer extracted;
   means for receiving a timing signal which corresponds to the zero justification and for producing a first pointer offset using said timing signal;
   means for producing second and third pointer offsets by advancing and retarding said first pointer offset by one time slot, respectively;
   means for selecting one of said first to third pointer offsets depending on said justification status; and
   means for comparing the pointer offset selected and said pointer value and outputting a signal indicative of a leading time slot of the data in the event that the comparison coincidence has been detected.

* * * * *